UNITED STATES PATENT OFFICE.

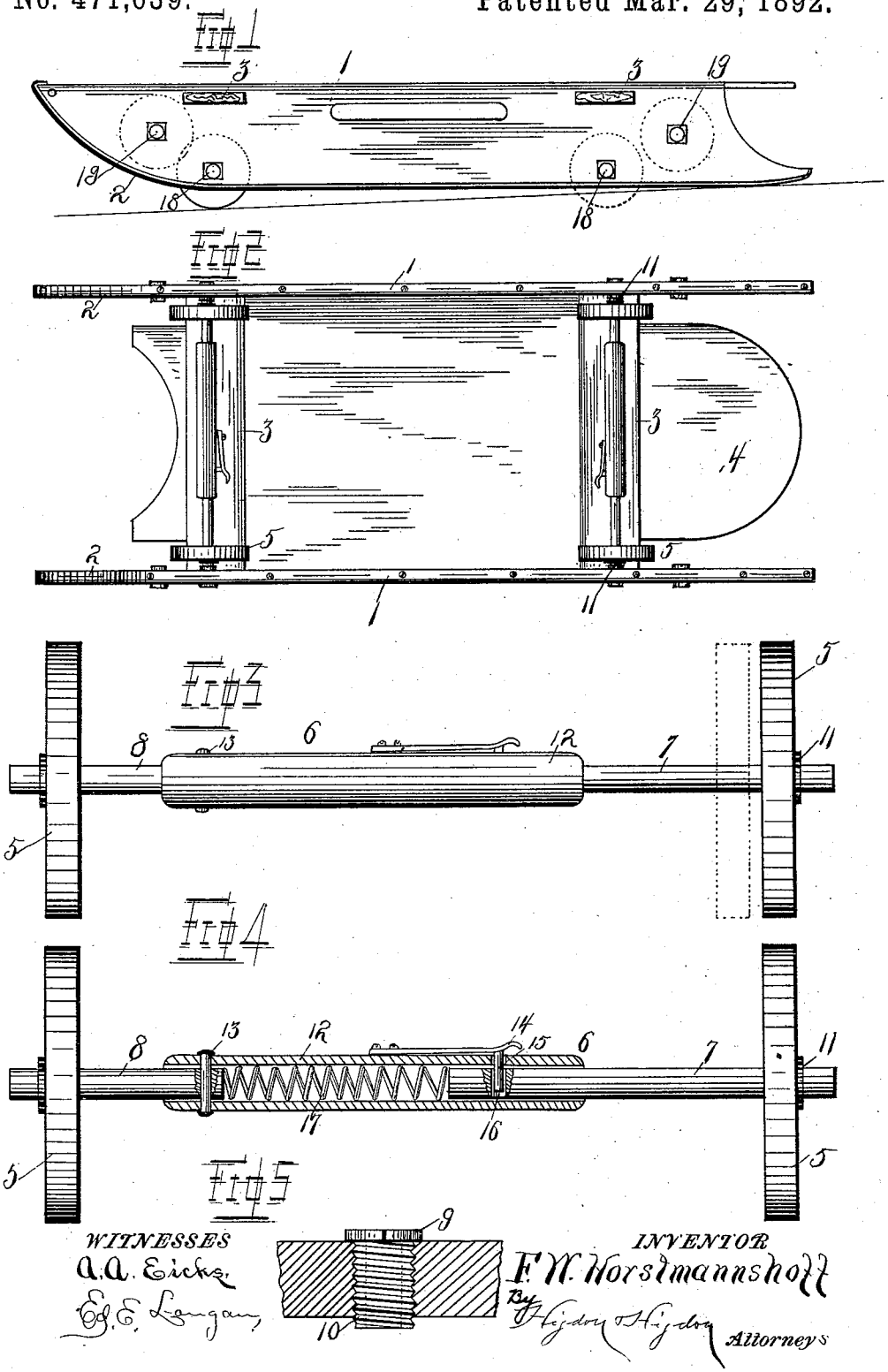

FRIEDRICH W. HORSTMANNSHOFF, OF ST. LOUIS, MISSOURI, ASSIGNOR OF ONE-HALF TO PETER M. KLING, OF SAME PLACE.

COMBINED SLED AND ROLLER-COASTER.

SPECIFICATION forming part of Letters Patent No. 471,639, dated March 29, 1892.

Application filed August 20, 1891. Serial No. 403,195. (No model.)

*To all whom it may concern:*

Be it known that I, FRIEDRICH W. HORSTMANNSHOFF, of the city of St. Louis, in the State of Missouri, have invented certain new and useful Improvements in a Combined Sled and Roller-Coaster, of which the following is a full, clear, and exact description, reference being had to the accompanying drawings, forming a part hereof.

My invention relates to improvements in a combined sled and roller-coaster; and it consists in the novel arrangement and combination of parts, as will be more fully hereinafter described, and designated in the claims.

In the drawings, Figure 1 is a side elevation of my invention. Fig. 2 is a bottom plan view of the same. Fig. 3 is a detail view of the wheels and axle. Fig. 4 is a sectional view of a sleeve for connecting the two parts of the axle, and Fig. 5 is a detail view of a screw-threaded boxing in which the ends of the axle are mounted when I use my invention for a wagon.

I will give a description of the use and object of my invention in connection with a mechanical description thereof.

Referring to the drawings, 1 indicates the runners, which are of the construction as illustrated in Figs. 1 and 2, and secured to the bottoms thereof in any suitable and mechanical manner are metallic strips 2. Said runners are connected together in operative form by means of transverse cross-pieces 3, which are embedded in said runners, so that the top surface of the bottom is flush with the top surface of the runners. Secured to said transverse cross-pieces 3 in any suitable and mechanical manner is a bottom 4 of the construction illustrated in Figs. 1 and 2.

Having given a general description of the sled mechanism, I will now proceed to describe the wagon mechanism. It may be noted in this connection, however, that my combined sled and roller-coaster may be used as a wagon and also as a coasting-sled, as illustrated in Fig. 1, wherein the front wheels are shown in contact with the ground and the rear wheels shown elevated in dotted lines in said figure. 5 indicates the wagon-wheels, which may be constructed of any suitable material and form, and 6 indicates the axles, which are composed of parts 7 and 8, said parts being cast integrally with said wheels 5. The parts 7 and 8 project and are mounted in screw-threaded bearings 9, said bearings 9 being provided with external screw-threads 10 and are screwed into the sled-runners 1, as illustrated in Fig. 5. The wheels are provided on their external faces with shoulders or hubs 11, the object of which is to prevent said wheels from coming in contact, or, more specifically, the rim of said wheels with the inner faces of the sled-runners 1, which would necessarily retard their revolution and lessen the speed of the wagon. The parts 8 of the axles are firmly secured in one end of a sleeve 12 by means of a rivet 13, as illustrated in Fig. 4, and the parts 7 of said axles are adjustably mounted in said sleeve and held in the proper position therein by means of a spring-catch 14, the catch 15 whereof passes through the sleeve 12 and snugly fits in a socket 16, formed in said parts 7, as illustrated in Fig. 4. Located in the sleeve 12 and interposed between the parts 7 and 8 of the axles is a spiral spring 17, the construction as illustrated in Fig. 4. Each of the sled-runners 1 is provided with a lower series of boxing 18, the construction of which is illustrated in Fig. 5, and an upper series 19 of similar construction.

Having described the mechanical construction of my invention substantially, I will now proceed to describe the use and operation of the same. When I desire to use my invention for a wagon, I mount the projecting portions of the parts 7 and 8 of the axles in the lower series of boxings 18. When I desire to use my invention for a coaster, I mount the front wheels, or, more specifically, the axles thereof, in the series of boxings 18 and the rear wheels in the series of boxings 19. (For illustration see Fig. 1.) By this operation it can be seen that the front wheel will hold the bottom 4 of the sled approximately in a horizontal position in descending an incline or hill, and the rear portions of the runners 1 will come in contact with the ground. When I desire to use my invention for a sled, I mount the axles in the upper series of boxings 19, as illustrated in Fig. 1, in which position the wheels are removed from the ground and consequently the runners 1 come in contact with and slide over the ground. In locating the axles in different boxings formed in the runners 1 it is only necessary to elevate the spring-catch 14 and push the adjustable portions 7 of the axle inwardly or outwardly in the sleeve 12, as desired.

It can be readily deduced from the construction as hereinbefore set forth that I can use my invention for a wagon, a sled, or a roller-coaster by the proper operation of mounting the bisectional axles in the appropriate boxings and also have the front and rear wheels made to rotate or revolve independently of each other.

Having fully described my invention, what I claim is—

1. A combined sled and roller-coaster having solid runners, a lower and an upper series of boxings secured to said runners, in which the axles of the wheels may be located, substantially as set forth.

2. A combined sled and roller-coaster having solid runners, a lower and upper series of externally-screw-threaded boxing secured in said runners, in which the axle of the wheels may be located, substantially as set forth.

3. In a combined sled and roller-coaster, a bisectional axle, a sleeve 12, in which one section of said axle is rigidly mounted and the other section thereof is adjustably mounted in said sleeve, a spiral spring 17, located in said sleeve and interposed between said sections, and a spring-catch 14 for holding said adjustable section in its appropriate position within said sleeve, substantially as set forth.

4. The combined sled and roller-coaster adapted to be used interchangeably or alternately as a sled or roller-coaster, the same having front wheels, as 5, arranged to project below the runners 1 and contact with the ground, while the rear wheels are located in a relatively-higher plane out of contact with the ground, substantially as set forth.

5. The combined sled and roller-coaster, the same having independent sets of wheels located in front and rear, the same being arranged for alternate contact with the ground, whereby either the front or rear wheels may be made to support a portion of the weight of the device, substantially as set forth.

In testimony whereof I affix my signature in presence of two witnesses.

FRIEDRICH W. HORSTMANNSHOFF.

Witnesses:
   ED. E. LOGAN,
   JNO. C. HIGDON.